United States Patent [19]
vom Schemm

[11] Patent Number: 5,615,894
[45] Date of Patent: Apr. 1, 1997

[54] SHAFT SEAL RING AND A METHOD AND A DEVICE OF MANUFACTURING SAME

[75] Inventor: Michael vom Schemm, Kiel, Germany

[73] Assignee: Dichtungstechnik G. Bruss GmbH & Co. KG, Hoisdorf/Hamburg, Germany

[21] Appl. No.: 588,668

[22] Filed: Jan. 17, 1996

[30] Foreign Application Priority Data

Jan. 20, 1995 [DE] Germany ............... 195 01 724.212

[51] Int. Cl.$^6$ ....................................... F16J 15/32
[52] U.S. Cl. ........................ 277/134; 277/152; 277/203; 277/213
[58] Field of Search ................... 277/134, 152, 277/203, 213

[56] References Cited

U.S. PATENT DOCUMENTS

| | | | |
|---|---|---|---|
| 4,709,930 | 12/1987 | Forch | 277/152 |
| 4,886,281 | 12/1989 | Ehrmann et al. | 277/152 |
| 5,209,502 | 5/1993 | Savoia | 277/152 |

FOREIGN PATENT DOCUMENTS

| | | |
|---|---|---|
| 0113663 | 7/1984 | European Pat. Off. . |
| 2460185 | 7/1975 | Germany . |
| 3402366 | 8/1985 | Germany . |
| 3542498 | 7/1986 | Germany . |
| 3607662 | 9/1987 | Germany . |
| 4307964 | 9/1994 | Germany . |
| 4324529 | 11/1994 | Germany . |
| 150658 | 11/1981 | Japan ........................ 277/152 |
| M720 | 7/1988 | Japan . |
| 9429622 | 12/1994 | WIPO . |

Primary Examiner—William A. Cuchlinski, Jr.
Assistant Examiner—Christina Annick
Attorney, Agent, or Firm—Lawrence J. Shurupoff

[57] ABSTRACT

A shaft seal ring as well as a method and a device of manufacturing same.

A shaft seal ring made of a PTFE compound comprises a sealing lip and a protective lip integrally formed therewith, wherein the sealing lip as well as the protective lip are provided with wavy recesses embossed during a manufacturing step.

10 Claims, 2 Drawing Sheets

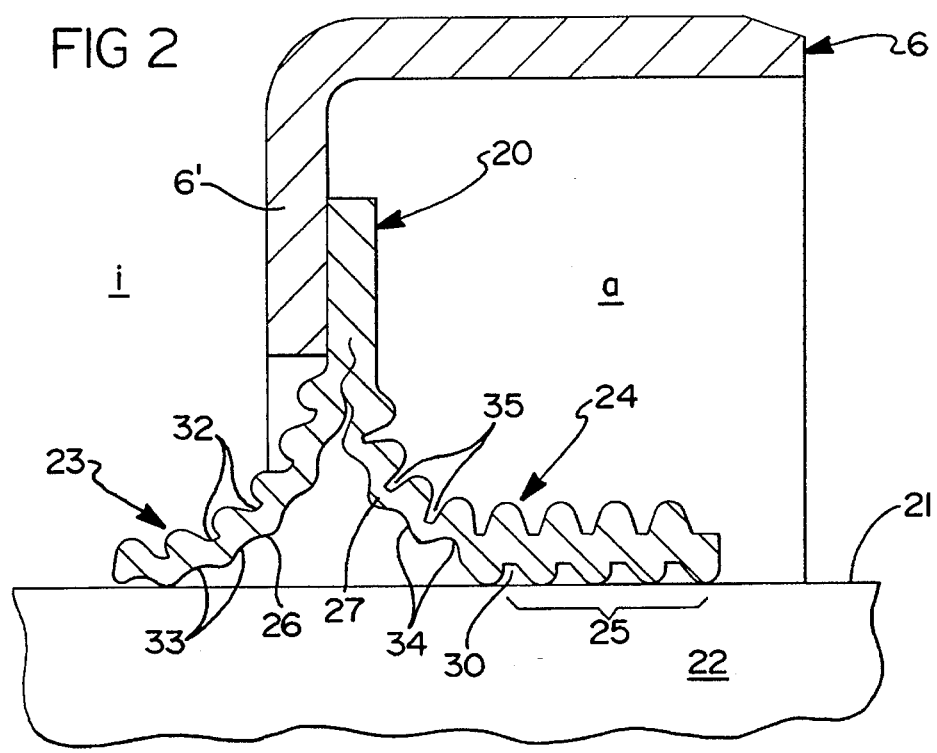
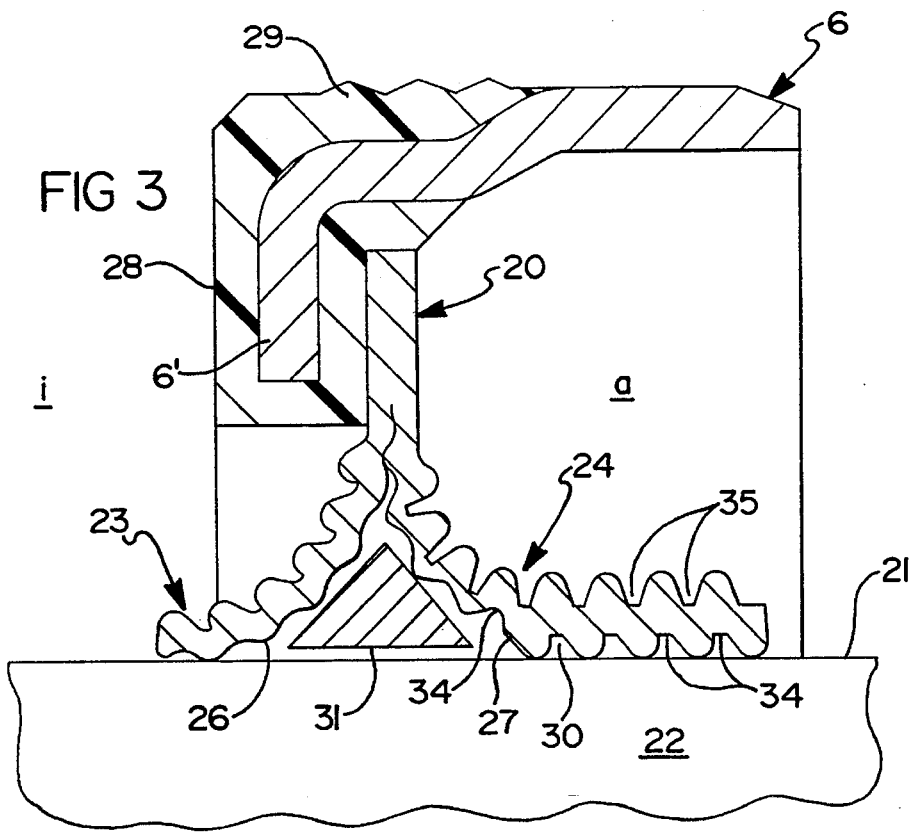

SHAFT SEAL RING AND A METHOD AND A DEVICE OF MANUFACTURING SAME

BACKGROUND OF THE INVENTION

1. Field of the Invention

The present invention refers to a shaft seal ring formed of a polytetrafluoroethylene (PTFE) compound or of a material which is similar with regard to the sealing behaviour or durability, comprising a sealing lip and a protective lip integrally formed therewith, as well as to a method and a device of manufacturing a shaft seal ring of that kind.

2. Description of Prior Developments

It is known (from DE-OS 24 60 185) to provide a shaft seal without a protective lip. On the side of the sealing lip facing the shaft embossed recesses having the shape of screw lines or threads are formed for returning oil to the oil side of the seal.

The recesses are embossed by a separate embossing tool into a seal wafer cut from a PTFE compound tube. The wafer is subsequently brought into final shape with a final embossing tool.

A shaft seal ring of the above-mentioned kind is also known from DE 33 27 229 A1 in which a protective lip integrally formed with the sealing lip is first peeled out of the PTFE compound on the front side of a plate. After forming a recess into the front side of the sealing lip adjacent the protective lip, cuts are made in the radial and in the axial direction. These cuts increase the flexibility of the seal and generate a return flow effect of the oil away from the sealing edge.

Finally, a shaft seal ring made of a PTFE compound is known from DE 36 07 662 A1 wherein the flexibility of the sealing lip is increased by cuts made on the two sides of the sealing lip the cuts are offset with respect to one another by half of the cut distance.

SUMMARY OF THE INVENTION

The object of the invention is to provide an easy to manufacture shaft seal ring of the above-mentioned kind as well as a method and a device of manufacturing the same, by means of which an increased sealing function and dust repelling function in a one-piece sealing element can be achieved.

The invention includes a seal lip with wavy recesses which can have the shape of one-threaded or multiple threaded helical grooves. The wavy recesses are embossed through the protective lip down to the sealing lip at least on the front side of the shaft seal ring, with the sealing lip portion facing the shaft. An embodiment is preferred in which the wavy recesses are completely embossed through the seal wafer in such a manner that constant bending flexibility is provided so the sealing lip as well as to the protective lip across the longitudinal extensions thereof. An embodiment is preferred in which the wavy recesses are offset on the rear side to the recesses on the front side in such a manner that a wave trough opposes a wave crest. An approximately constant wall thickness across the length of the sealing lip or protective lip is achieved thereby, which is responsible for a constant bending stress of the shaft seal ring during operation.

The method according to the invention requires a minimum of working steps. The shaft seal ring is brought to its final shape by embossing the wavy recesses. In contrast to DE-OS 24 60 185, a further shaping step that requires a further embossing shape is not necessary.

For assembly, it is of advantage to insert a spreader ring between the sealing lip and the protective ring. The spreader ring is made of a solid material having lubrication properties and melting at an operating temperature of the shaft seal ring, as can be derived from DE 43 24 529 C1.

A device for manufacturing a shaft seal ring according to the invention is very simple. It is necessary for this device that at least the one formed part facing the front side of the PTFE-plate or seal wafer is provided with the wavy recesses in negative contour, wherein the formed part facing the rear side of the plate or wafer can be smooth. It is ensured thereby that the wavy recesses are embossed through the protective lip down to the front side of the sealing lip to guarantee the formation of wavy recesses on the side of the sealing lip facing the shaft.

It is preferred if the other formed part facing the rear side is provided with the wavy recesses, which are preferrably displaced radially offset with respect to the one formed part. This guarantees a complete embossing through all effective areas of the shaft seal ring.

The wavy recesses create a hydrodynamic return flow effect, wherein a conveying effect in the counter direction of the conveying effect of the wavy recesses on the front side of the sealing lip is achieved on the rear side of the protective lip opposite the other formed part. Whereas the sealing lip has a conveying effect in the direction of the oil side of the shaft seal ring to be sealed, the protective lip convey outwardly towards the air side of the seal and thereby ensures an additional dynamic sealing effect against dust entering from the air side. This is a decisive non-foreseeable functional advantage of the shaft seal ring according to the invention, which is based on the "inverse" configuration of the recesses, which are necessarily formed on the rear side of the protective lip on one hand and on the front side of the sealing lip on the other side during embossing.

The PTFE compound materials for the protective lip on one side and the sealing lip on the other side can be different. In practical application this can be achieved in that the seal wafer is cut of two tubes inserted into each other which have differently defined PTFE compounds, the tubes being fixedly connected to one another during a sintering process. This enables an optimization of the sealing and wear behaviour of the shaft seal ring because the front side of the sealing lip engaging the shaft is formed of a PTFE compound especially adapted to the preconditions of operation during oil lubrication and the protective lip is formed of a different PTFE compound especially adapted to the preconditions of the dry run of the protective lip.

If required, a holding member for the shaft seal ring can be found of an inexpensive PTFE compound, which does not have to fulfill the high sealing and wear requirements in the contact region of the seal ring.

A layer of an elastomeric material can be provided in the region of the outer diameter of the shaft seal ring in order to hold the shaft seal ring, the layers serving as a seat in a carrier body or as a housing. The bonding of a sealing element made of PTFE by an elastomeric material vulcanized to a metallic carrier body is known from DE 33 09 538 C2. According to the invention, the elastomeric material, that is required for the bond between the shaft seal ring and the metal of a carrier body, provides a partially or fully rubber covered region at the outer periphery of the shaft seal ring and forms a seat for the shaft seal ring in a housing.

The geometry of the recesses embossed through the shaft seal ring according to the invention can be varied in accordance with the purposes of application of the shaft seal ring. The geometry can be adapted to the objects of sealing fluids of high or low viscosity or for reducing the air suction below the sealing edge.

Recent research noted in SAE Technical Paper, No. 930531, Mar. 01, 1993 has revealed that the distribution of the pressure of the sealing lip to the shaft at the oil end of the sealing lip no longer has a pressure maximum, even though the highest deformation occurs at this location. The pressure maximum is rather displaced towards the air end. An additional statical seal should preferrably be provided at the air end and not at the oil end of the sealing lip, since otherwise the contact surface between the seal and the shaft, biased by the highest pressure, would run dry.

Even though the cross-section of the hydrodynamically acting wavy recesses is so large that during operation a proper dynamic sealing is guaranteed, difficulties occur with regard to the static tightness when the shaft is standing still. According to a further development of the invention, a transverse web is provided at the air end of the abutting sealing lip in the recess or in any recess, the transverse web serving as a bulkhead in particular for the static sealing when the shaft is standing still. The transverse web or the transverse webs prevent any medium from reaching and from draining in an area outside the sealing lip through the recesses preferrably provided in the shape of one-threaded or multiple threaded threads. It is furthermore ensured by this measure that the area of the sealing lip abutting the shaft is constantly wetted with the medium to be sealed and that a dry run of the sealing lip is excluded thereby.

BRIEF DESCRIPTION OF THE DRAWINGS

The invention will now be described by the aid of schematical drawings of embodiments including further details.

FIG. 2 is a partial axial view through a half of a shaft seal ring according to the invention in assembled condition;

FIG. 3 is a modified shaft seal ring according to the invention in a view as in FIG. 2.

Figure 1:
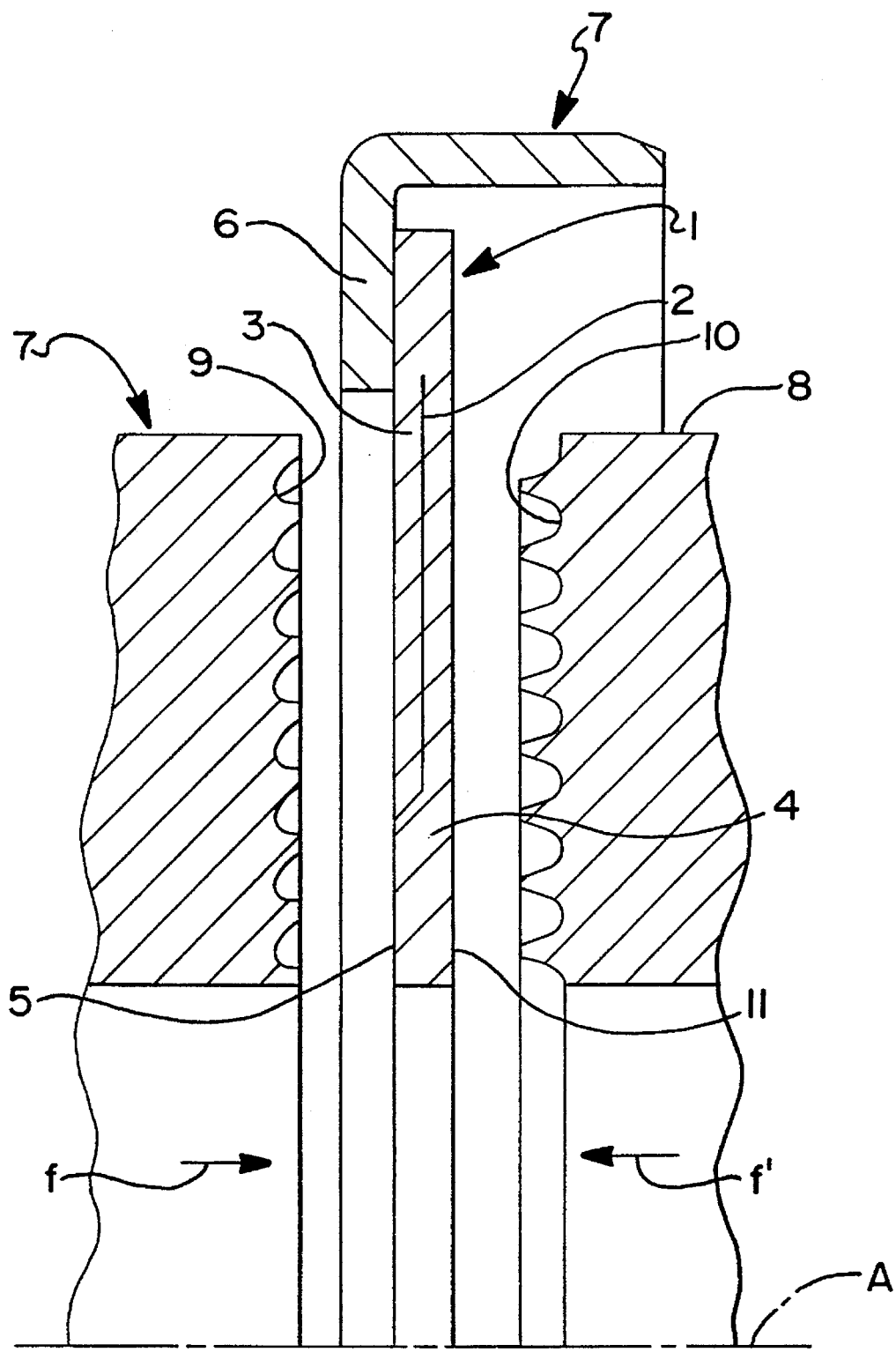
FIG. 1 is a view of the manufacture of a shaft seal ring according to the invention with a device according to the invention.

Equal or equally acting components are indicated by equal reference numerals in the drawings.

DETAILED DESCRIPTION OF THE PREFERRED EMBODIMENTS

In FIG. 1 a blank for a shaft seal ring is indicated by reference numeral 1. This blank is in the form of a plate or wafer made of a PTFE compound, which is cut off a tube. Furthermore, a cut is made along line 2 so that a protective lip portion 3 is peeled from the plate 1 and is thus separated from a sealing lip portion 4. This sealing lip portion protrudes radially over the inner end of the protective lip portion towards the interior of the seal ring.

At its radial outer end, the annular plate 1 on the protective lip side 5 of the blank is adhered to the radial flange 6' of a metallic carrier body 6 or is connected in a different manner.

The blank 1 designed in this manner is inserted into a mold having left and right formed parts 7, 8. The formed parts 7, 8 are movable parallel to the axis A against the blank 1 in the directions of arrows f, f'. The formed parts 7,8 have wavy recesses on their sides facing the blank 1. The recesses have the shape of threaded grooves 9, 10 of different profiles. Thus, the threaded grooves (one-threaded or multiple threaded) of the formed part 7 are inclined with regard to the axial direction, whereas the threaded grooves 10 of the formed part 8 are oriented parallel to the axis a in depth direction and are radially such a manner that the crests of the threaded grooves 9 seen in the axial direction approximately oppose the troughs of the threaded grooves 10.

The recesses 9, 10 serve for embossing respective wavy recesses into the front side 5 and the rear side 11 of the blank 1, by driving the two formed parts 7, 8 in the axial direction (f, f') against the blank 1. The formed parts are punched into the blank for embossing the respective recesses.

Instead of the contours of the recesses 9, 10, as shown in FIG. 1, these contours can also be provided laterally reversed. A radial displacement of the recesses is preferred in a manner that the wall thickness of the plate 1 is basically equal over the radial extensions thereof.

FIG. 2 shows a shaft seal ring 20, which is manufactured according to FIG. 1 and which is mounted on the periphery 21 of a shaft 22. In assembled condition, the protective lip 23 is spread in the direction toward the air side away from the sealing lip 24, which is bent backwards towards the oil side "a". Sealing lip 24 is pressed to the shaft with the front sealing section 25 corresponding to the front side 5 thereof according to FIG. 1. It is evident that owing to the offset of the recesses 9, 10 of the formed parts 7, 8 the cross-sections of the lips 23, 24 are provided with complementary or matching wavy, embossed recesses 32 to 35 and have a constant cross section over the length thereof and thus have approximately constant flexibility. The "inverse" complementary recesses 33 provided on the rear side 26 of the protective lip 23 convey or pump in the direction of the air side "i", whereas the recesses provided on the front side 27 of the sealing lip 24 convey or pump in the direction of the oil side "a" of the seal. This suprisingly improves the dust-repelling as well as oil returning effect of the shaft seal ring 20.

FIG. 3 shows two modifications of the shaft seal ring manufactured in the same manner as in FIG. 2. The metallic carrier body 6 having a radial flange 6' is vulcanized with the radially outer end of the shaft seal ring 20 by interposition of a layer made of an elastomeric material, wherein this layer provides in a radially outer region 29 a seat for holding the shaft seal ring in a housing.

Moreover, a spreader ring 31 made of a solid material having lubricating properties is inserted between the protective lip 23 and the sealing lip 24 as an aid to assembly. Ring 31 melts upon reaching the operating temperature of the shaft seal ring 20.

In the embodiments according to FIG. 2 and in the embodiment according to FIG. 3, the sealing lip 24 in the press part 25 includes a transverse web 30 in at least one recess toward the air end for preventing penetration of fluid to be sealed and in particular when the shaft 22 is standing still. In case of multiple threaded screw-line shaped recesses, a transverse web 30 of that kind is provided in each thread.

What is claimed is:

1. A shaft seal, comprising:

a carrier; and a wafer mounted to the carrier, said wafer comprising a sealing lip and a protective lip each having a shaft-engaging surface formed with an embossed hydrodynamic surface, wherein said protective lip and said sealing lip are formed integrally on said wafer and wherein at least a portion of said embossed hydrodynamic surface formed on said protective lip comprises a surface profile which complements, matches and fits within said embossed hydrodynamic surface formed on said sealing lip as said profile is formed.

2. The seal of claim 1, wherein said embossed hydrodynamic surface formed on said protective lip comprises a surface profile which complements and matches said embossed hydrodynamic surface formed on said sealing lip.

3. The seal of claim 1, wherein said sealing lip comprises a rear surface opposite its shaft-engaging surface and wherein said rear surface of said sealing lip is embossed with a profile which is offset from and complementary to said embossed hydrodynamic surface on said shaft-engaging surface Of said sealing.

4. The seal of claim 1, wherein said protective lip comprises a rear surface opposite its shaft-engaging surface and wherein said rear surface of said protective lip is embossed with a profile which is offset from and complementary to said embossed hydrodynamic surface on said shaft-engaging surface of said protective lip.

5. The seal of claim 1, wherein said hydrodynamic surface formed on said sealing lip comprises a threaded groove.

6. The seal of claim 1, wherein said hydrodynamic surface formed on said protective lip comprises a threaded groove.

7. The seal of claim 1, wherein said sealing lip comprises a first material and said protective lip comprises a second material.

8. The seal of claim 1, wherein said wafer comprises polytetrafluoroethylene (PTFE) and wherein said wafer is bonded to said carrier with an elastomeric material.

9. The seal of claim 1, wherein said sealing lip further comprises a transverse web formed on its shaft-engaging surface for providing a bulkhead against static leakage.

10. The seal of claim 1, further comprising a spreader ring disposed between said sealing lip and said protective lip.

* * * * *